Inventor
William R. Strickland
by Robert L. Thompson
his atty.

Inventor
William R. Strickland
by Robert L. Thompson
his atty.

June 1, 1937.  W. R. STRICKLAND  2,082,231
INTERNAL COMBUSTION ENGINE
Filed Sept. 30, 1935  6 Sheets-Sheet 4

Inventor
William R. Strickland
by Robert L. Thompson
his Atty.

June 1, 1937.  W. R. STRICKLAND  2,082,231
INTERNAL COMBUSTION ENGINE
Filed Sept. 30, 1935  6 Sheets-Sheet 5

Inventor
William R. Strickland
by Robert L. Thompson
his Att'y.

June 1, 1937. W. R. STRICKLAND 2,082,231
INTERNAL COMBUSTION ENGINE
Filed Sept. 30, 1935 6 Sheets-Sheet 6
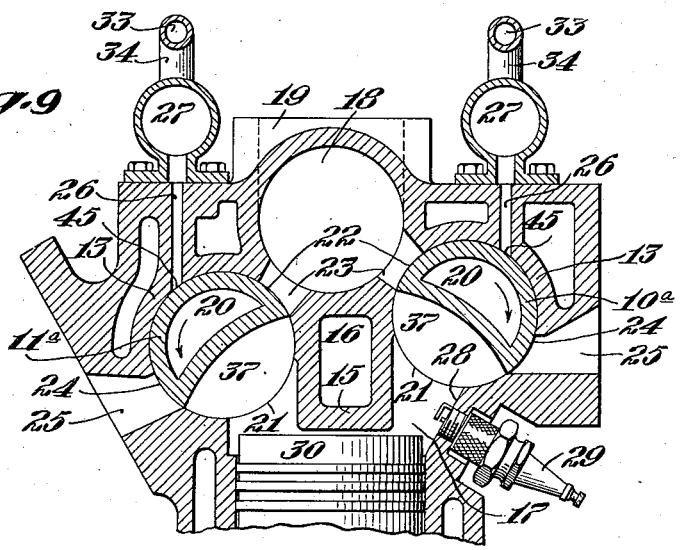

Patented June 1, 1937

2,082,231

UNITED STATES PATENT OFFICE 2,082,231

INTERNAL COMBUSTION ENGINE

William R. Strickland, Detroit, Mich.

Application September 30, 1935, Serial No. 42,847

10 Claims. (Cl. 123—190)

This invention relates to internal combustion engines having one or more rotary valves and one or more cylinders.

Rotary valve internal combustion engines have been made with two rotary valves, one of which serves to periodically open an inlet port to admit the fuel mixture to the cylinder and the other of which serves to periodically open an exhaust port to allow the burnt gases to pass to an exhaust passage. Such engines have proved to be unsatisfactory for high speeds for several reasons, the principle of which is that a single inlet port is too small to provide sufficient capacity for high speeds unless the cross section of the rotary valve is increased to such an extent that the valve is too heavy and cumbersome for high speed rotation, and another of which is that the timing of the communication between the inlet port and the cylinder, and the exhaust port and the cylinder can not be varied over a broad enough range.

The principal object of my invention is to provide a rotary valve internal combustion engine adapted for the required capacity for high speed operation.

Another object is to provide a rotary valve engine with a chamber which I shall call a conserving chamber, in which sufficient pressure is maintained to return to the fuel mixture reservoir the quantity of fuel mixture which collects in the passage of the rotary valve upon each revolution thereof, thereby saving large quantities of fuel mixture which otherwise would pass out through the exhaust passage.

Other objects are to provide an internal combustion engine with two valves, each of which has a single passage adapted to successively admit fuel mixture to the cylinder and exhaust gases to the exhaust passage; to provide a novel form of combustion chamber; novel cooling means for the combustion chamber and the valve; novel valve timing; and a novel unsymmetrical arrangement of the valves with respect to the cylinder, thereby providing a space for a spark plug.

The invention itself, however, together with additional objects and advantages thereof, will best be understood from consideration of the following description and the accompanying drawings which exemplify embodiments thereof.

In the drawings:

Fig. 9 is a cross-sectional view similar to Fig. 2 showing the position of two rotary valves at top dead center of the piston between exhaust and suction strokes.

Figure 1:
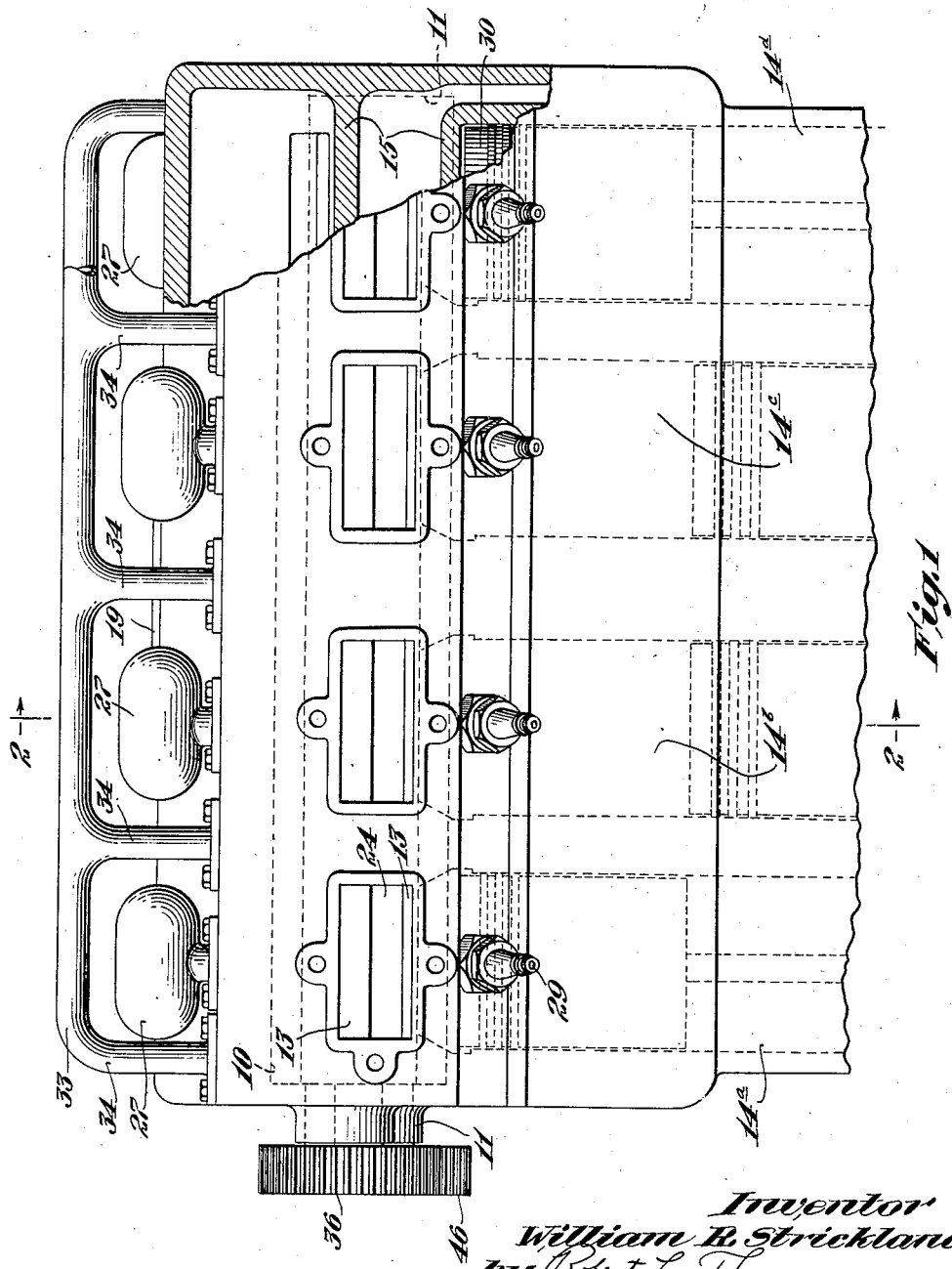
Fig. 1 is a view in side elevation of a four cylinder internal combustion engine, with parts broken away and shown in section, embodying two rotary valves.
Figure 4:
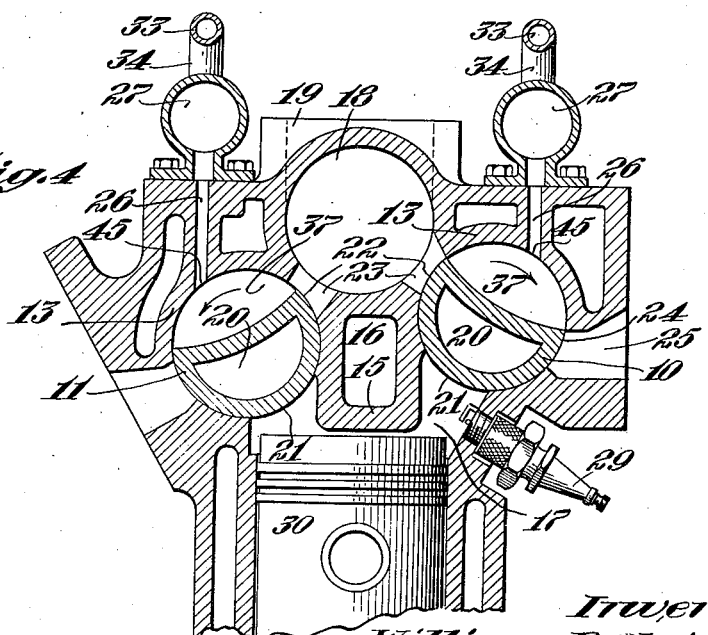
Fig. 4 is a sectional view similar to Fig. 2, showing the position of the valves with the piston at top dead center at the completion of the compression stroke and commencement of the firing stroke.
Figure 7:
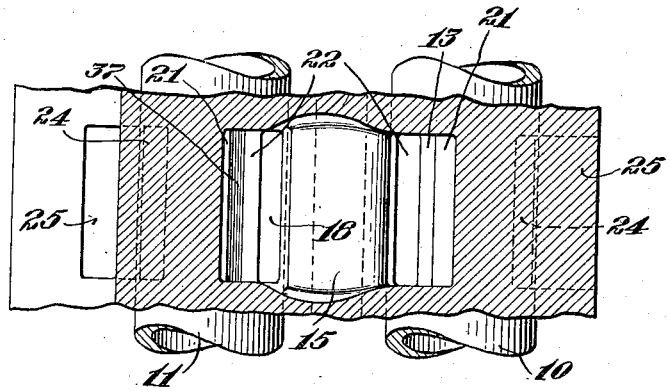
Fig. 7 is a sectional view taken on the line 7—7 of Fig. 3, but showing the full lengths of cylinder, exhaust and intake ports.

The engine shown in the drawings is a four cylinder, four cycle engine having two hollow cylindrical valves 10 and 11, one mounted for rotation in each of the two valve casings 13 (Fig. 2) which extend parallel to each other across the top of the cylinders 14$^a$, 14$^b$, 14$^c$, and 14$^d$ (Fig. 1). The inner adjacent walls of the respective valve casings are formed by a bridge member 15 (Fig. 2) which is provided with a passage 16 adapted to permit the circulation of a cooling medium such as water. The lower portion of this bridge member 15 forms part of the top of the combustion chamber 17 (as shown in Figs. 4 and 7) and divides the combustion chamber into two connected parts (see Fig. 4). The top of said bridge member serves as the bottom of the intake header 18 which is the fuel mixture reservoir. A carburetor (not shown) is mounted upon the support 19 above said intake header and supplies fuel mixture thereto. The passages 20 in the valves are adapted to permit the circulation of a suitable cooling medium.

Each valve casing for the block of four cylinders is provided with four cylinder ports 21, one adjacent each power cylinder and communicating with the combustion chamber thereof; with four corresponding inlet ports 22 each communicating by means of an inlet passage 23 with the intake header 18; with four corresponding exhaust ports 24 each communicating by means of an exhaust passage 25 with an adjacent exhaust header (not shown); and with four corresponding conserving ports 45 each communicating by means of a conserving passage 26 with the respective adjacent conserving chamber 27. In the embodiment shown in the drawings two exhaust headers (not shown) are utilized, one on either side of the engine extending longitudinally thereof adjacent the outer ends of the exhaust passages 25. Individual conserving chambers 27 are utilized, two above each cylinder, although two conserving chambers extending longitudinally of the engine may be utilized.

The valve 10 is mounted at a greater distance above the cylinder than the valve 11 to provide four spaces 28 between the lower edges of the adjacent cylinder ports 21 and the upper edge of the adjacent cylinders, and four spark plugs 29 are mounted in said spaces, one spark plug communicating with each adjacent combustion chamber.

Four pistons 30 are provided, one mounted in each of the four cylinders, and each piston is provided with a connecting rod 31 which connects the piston with the crank shaft 32.

Figure 8:
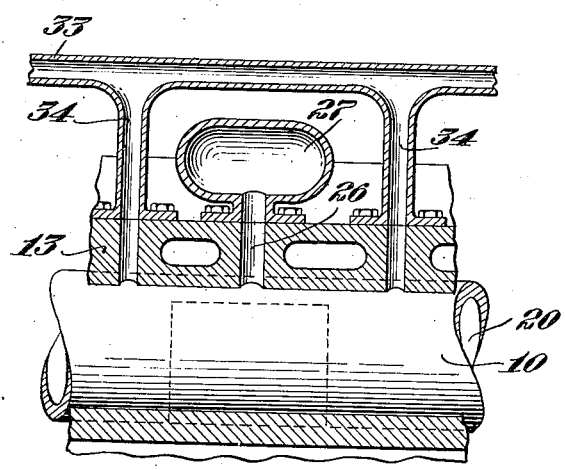
Fig. 8 is a sectional view taken on the line 8—8 of Fig. 2.

A lubricating oil system 33 is provided having ten passages 34 which conduct oil to the surface of each valve at points adjacent both ends of each valve and at points on the surface of each valve between each of the cylinders, as shown in Figs. 1 and 8. This oil system may be connected with the usual engine oil feed system (not shown) to provide circulating means therefor, or if colder and/or heavier oils are desired they may be circulated in the oil system 33 by an auxiliary circulating system (not shown).

The valves 10 and 11 are journaled for rotation in suitable bearings and are each rotated at one-half the speed of crank shaft rotation, for example by a gear 36 on one end of the valve 10 and a gear 46 on one end of the valve 11, which gears are connected to a gear (not shown) on one end of the crank shaft by suitable reduction gears (not shown), or, for example, by means of a chain or other drive. In the present embodiment the valve 10 rotates in a clockwise direction and the valve 11 rotates in a counterclockwise direction looking at Fig. 2.

Figure 5:
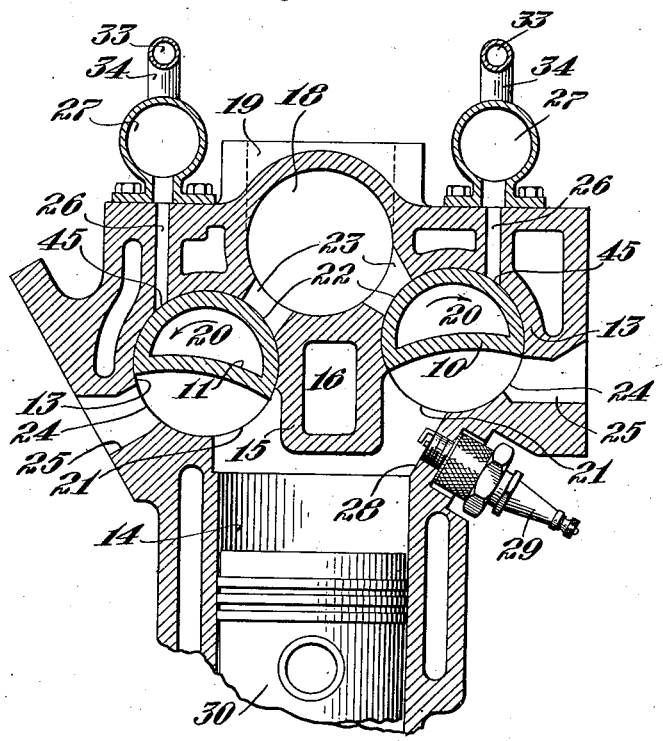
Fig. 5 is a sectional view similar to Fig. 2, showing the position of the valves with the piston traveling upwardly on the exhaust stroke.
Figure 6:
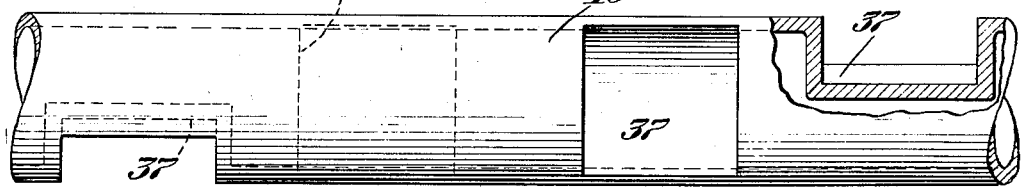
Fig. 6 is a view in side elevation, with parts broken away, of one of the rotary valves.

Each valve is provided with four peripheral depressions or passages 37 at intervals along its length and upon rotation of the valves, each passage is adapted to register with the adjacent ports to successively provide communication between the adjacent cylinder and inlet ports (Figs. 2 and 3), the adjacent inlet and conserving ports, the adjacent conserving and exhaust ports and the adjacent exhaust and cylinder ports (Fig. 5).

Figure 2:
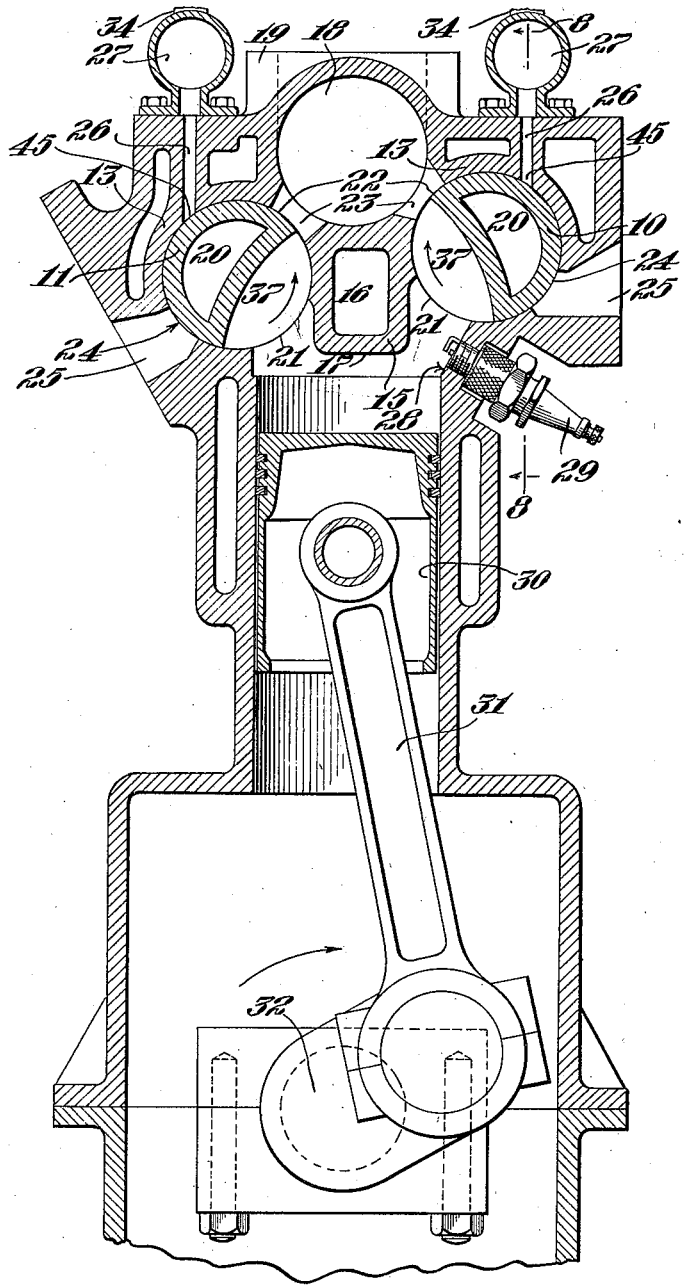
Fig. 2 is a cross-sectional view taken on the line 2—2 of Fig. 1, showing the position of the valves shortly after the commencement of the suction stroke of the piston.
Figure 3:
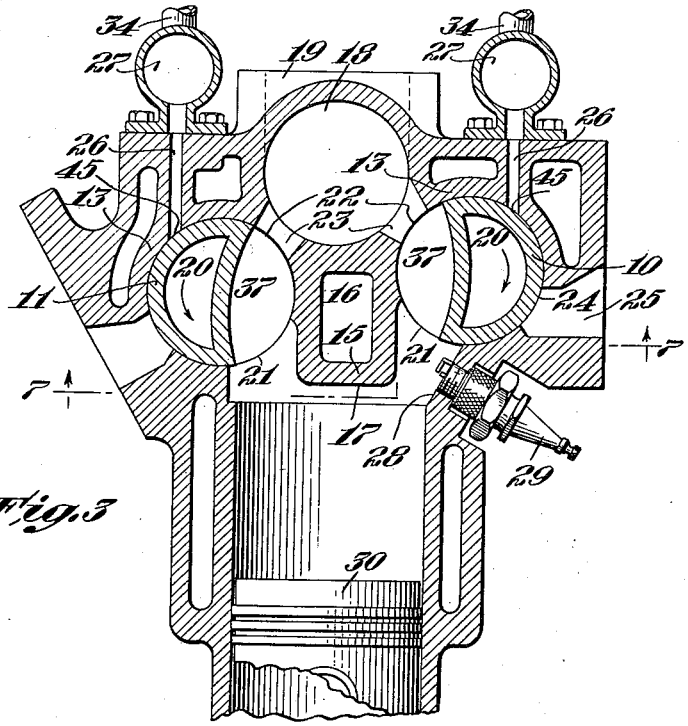
Fig. 3 is a cross-sectional view similar to Fig. 2, showing the position of the valves in a later stage of the suction stroke.

In Figs. 2 and 3 the valves 10 and 11, by means of their respective valve passages, are providing communication between the adjacent cylinder and inlet ports at different stages of the suction stroke of the piston. In Fig. 4 the positions of the valves 10 and 11 are shown at top dead center of the piston as the compression stroke has been completed and as the spark plug is firing. In Fig. 5 the positions of the valves are shown at one stage of the exhaust stroke of the piston showing the respective valve passages providing communication between the adjacent cylinder and exhaust ports.

Thus on each revolution of each valve (every two revolutions of the crank shaft) each valve opens communication between the intake header and the four cylinders and between the exhaust header and the four cylinders, drawing fuel mixture into the cylinder during the former communication and expelling exhaust gases from the cylinder during the latter communication.

As the valve 10 rotates in a clockwise direction from the position in which it is shown in Fig. 4, the valve passage 37 immediately provides communication between the conserving port 45 and the exhaust port 24, and such communication is maintained until the left-hand peripheral edge (looking at Fig. 4) of the valve passage, has rotated beyond the conserving port. During this communication exhaust gases are forced through the exhaust port, valve passage, conserving port, conserving passage 26 and into the conserving chamber 27, building up a pressure therein substantially equal to the pressure in the exhaust header. This pressure is confined in the conserving chamber until the valve 10 reaches a position after the position shown in Fig. 3, i. e., until the right-hand (looking at Figs. 3 and 4) peripheral edge of the valve passage has passed beyond the left-hand peripheral edge of the conserving port, at which time the valve passage opens communication between conserving port and the inlet port 22. This communication between conserving and inlet ports is maintained until the valve reaches the position shown in Fig. 4. During said communication the pressure in the conserving chamber, built up by exhaust gases, forces the fuel mixture retained in the valve passage back through the inlet port 22 into the intake header 18, thereby saving said quantity of fuel mixture which would otherwise pass out the exhaust header. It should be noted that the pressure in the intake header is less than the pressure in the exhaust header and also less than the pressure in the conserving chamber.

The conserving chamber above the valve 11 works similarly, but the valve 11 operates in a counterclockwise direction, looking at Figs. 2 to 5, inclusive.

The bridge member 15 has several functions among which are forming part of the upper wall of the combustion chamber, reducing the size of the combustion chamber thereby increasing the compression ratio, dividing the combustion chamber into two parts (see Fig. 4) which are connected only by a small passage when the piston is at top dead center, cooling the combustion chamber and cooling parts of the valve casing.

The spark plug fires substantially at top dead center of the piston between compression and firing strokes.

The shape of the combustion chamber provided by the lower part of the bridge has two important functions; first, as the piston approaches top dead center on the compression stroke the bridge member creates two eddy currents or streams of fuel mixture which pass on either side of the bridge, and these eddy currents create turbulence which breaks up the gasoline or fuel into a better mixture of gasoline and air thereby producing better combustion; and second, when the piston is at top dead center, which is when the spark plug fires, the speed of the pressure wave from the right-hand part of the combustion chamber (looking at Fig. 4) to the left-hand part of the combustion chamber is considerably reduced due to the small space between the lower face of the bridge member and the top of the piston, but the speed of the flame front is less affected and it passes quickly through said space and ignites the mixture in the left-hand part of the combustion chamber before the mixture there reaches a detonation stage of pressure.

Preferably the valve and valve casing are made of metals of different coefficients of expansion, the valve casing being made of a metal having a higher coefficient of expansion than the metal of which the valve is made. For example, the valve casing may be made of bronze or aluminum and the valve of invar or steel. Since the circulation of a cooling medium such as water is relied upon to keep the valve and valve casing at a predetermined temperature and operating fit, the use of metals of different coefficients of expansion, as disclosed, will tend to keep the clearance between valve and casing constant or increase the same slightly in the event of failure or partial failure of the cooling system, thus preventing seizure under adverse conditions.

The provision of two rotary valves 10 and 11, each functioning to act both as inlet valve and as exhaust valve, provides two inlet ports for each cylinder (one for each valve) thereby providing the necessary total inlet port area for high speed operation of the engine without the necessity for the use of a valve with a large diameter, whereas a single valve to provide an equal inlet port area would necessarily be too large for satisfactory rotation due to the increased friction from rubbing velocity at the high speed required and would also be so large that maintaining moderate clearances under the increased expansion or warpage under heat changes would be more difficult. The provision of two such rotary valves also provides a wide range of timing diagram selection since the intake and/or exhaust events of one valve may be delayed with respect to the corresponding events of the other valve, thereby providing longer total intake and/or exhaust periods due to the combined effect of the two valves.

For example, the valve 10 disclosed in Figs. 2 to 5, inclusive, of the drawings, is timed to open communication between its adjacent inlet and cylinder ports at 20° of crank shaft rotation after top dead center of the piston between exhaust and suction strokes and to close said communication at 25° of crank shaft rotation after bottom dead center of the piston between suction and compression strokes, thereby maintaining intake open for 185° of crank shaft rotation. The valve 11, disclosed in Figs. 2 to 5, inclusive, is timed to open communication between its adjacent inlet and cylinder ports at 40° of crank shaft rotation after top dead center of the piston between exhaust and suction strokes and to close said communication at 45° of crank shaft rotation after bottom dead center of the piston between suction and compression strokes, thereby maintaining said communication for 185° of crank shaft rotation. The combined effect of the two valves 10 and 11 with such a timing diagram is to provide communication between inlet and cylinder ports from 20° of crank shaft rotation after top dead center to 45° of crank shaft rotation after bottom dead center of the piston or a total of 205° of crank shaft rotation.

The valve 10 is timed to open communication between its adjacent exhaust and cylinder ports at 25° of crank shaft rotation before bottom dead center of the piston between firing and exhaust strokes and to close said communication at top dead center of the piston between exhaust and suction strokes, thereby maintaining said communication for 205° of crank shaft rotation. The valve 11 is timed to open communication between its adjacent exhaust and cylinder ports at 5° of crank shaft rotation before bottom dead center of the piston between firing and exhaust strokes and to close said communication at 20° of crank shaft rotation after top dead center of the piston between exhaust and suction strokes, thereby also maintaining said communication for 205° of crank shaft rotation. The combined effect of the valves 10 and 11 is therefore to provide communication between cylinder and exhaust ports for 225° of crank shaft rotation.

It will be noted that in the above timing of the valve 10 exhaust closes at top dead center and intake opens 20° of crank shaft rotation after top dead center (10° of valve rotation after top dead center). During this 10° interval of valve rotation between exhaust close and intake open, suction is being created in the cylinder and this suction tends to prevent exhaust gases which remain in the cylinder after top dead center from passing to the intake header, as would tend to happen if intake opened at top dead center.

I have found, however, that when a valve is timed to open communication between the adjacent inlet and cylinder ports after top dead center of the piston between exhaust and suction strokes, the width of the inlet port must necessarily be reduced to prevent communication between the exhaust and inlet ports through the valve passage. When the width of the inlet port is thus reduced, capacity is sacrificed. Furthermore, when communication between adjacent inlet and cylinder ports is opened after top dead center, the first part of the suction stroke is not utilized to admit fuel mixture to the combustion chamber. I believe, therefore, for the two above reasons, that maximum capacity is obtained when each valve is timed to open communication between adjacent inlet and cylinder ports at top dead center of the piston between exhaust and suction strokes, and such timing of both valves is disclosed in Fig. 9 of the drawings, where the piston 30 is shown at top dead center between the exhaust and suction strokes, and where both the valve 10ᵃ and the valve 11ᵃ have just closed communication between adjacent cylinder and exhaust ports and are about to open communication between the adjacent cylinder and inlet ports.

It is obvious that when intake opens at the top dead center between exhaust and suction strokes, the communication between exhaust and cylinder ports must be closed at or before top dead center between exhaust and suction strokes, for otherwise the exhaust gases will communicate with the combustion chamber when the fuel mixture gases are also in communication therewith. To utilize the maximum amount of the exhaust stroke I have arranged the valves in Fig. 9 to close communication between exhaust and cylinder ports at top dead center of the piston between exhaust and suction strokes.

I claim:

1. In an internal combustion engine, a cylinder, a conserving chamber, a valve casing extending across said cylinder and a cylindrical valve rotatably mounted in said valve casing, said valve casing having a cylinder port communicating with said cylinder, an inlet port communicating with an intake header, an exhaust port communicating with an exhaust header, and a conserving port communicating with said conserving chamber, and said valve having a passage formed therein arranged to register with said ports to successively provide communication between said cylinder port and said inlet port, between said inlet port and said conserving port, between said conserving port and said exhaust port, and between said exhaust port and said cylinder port.

2. In an internal combustion engine, a cylinder, a plurality of valve casings extending across said cylinder, a plurality of conserving chambers and a plurality of cylindrical valves, one rotatably mounted in each of said valve casings, each of said valve casings having a cylinder port communicating with said cylinder, an inlet port communicating with an intake header, an exhaust port communicating with an exhaust header and a conserving port communicating with one of said conserving chambers, each of said valves having a passage formed therein arranged to register with said ports to successively provide communication between the adjacent cylinder port and the adjacent inlet port, between the adjacent inlet port and the adjacent conserving port, between the adjacent conserving port and the adjacent exhaust port, and between the adjacent exhaust port and the adjacent cylinder port.

3. In an internal combustion engine, a cylinder, a plurality of valve casings extending across said cylinder, a conserving chamber and a plurality of cylindrical valves, one rotatably mounted in each of said valve casings, each of said valve casings having a cylinder port communicating with said cylinder, an inlet port communicating with an intake header, an exhaust port communicating with an exhaust header and a conserving port communicating with said conserving chamber, each of said valves having a passage formed therein arranged to register with said ports to successively provide communication between the adjacent cylinder port and the adjacent inlet port, between the adjacent inlet port and the adjacent conserving port, between the adjacent conserving port and the adjacent exhaust port, and between the adjacent exhaust port and the adjacent cylinder port.

4. In an internal combustion engine, a cylinder, two valve casings extending across said cylinder, two conserving chambers and two cylindrical valves, one rotatably mounted in each of said valve casings, each of said valve casings having a cylinder port communicating with said cylinder, an inlet port communicating with an intake header, an exhaust port communicating with an exhaust header and a conserving port communicating with a conserving chamber, each of said cylindrical valves having a passage formed therein arranged to register with said ports to successively provide communication between the adjacent cylinder port and the adjacent inlet port, between the adjacent inlet port and the adjacent conserving port, between the adjacent conserving port and the adjacent exhaust port, and between the adjacent exhaust port and the adjacent cylinder port.

5. In an internal combustion engine, a cylinder, two valve casings extending across said cylinder, a conserving chamber and two cylindrical valves, one rotatably mounted in each of said valve casings, each of said valve casings having a cylinder port communicating with said cylinder, an inlet port communicating with an intake header, an exhaust port communicating with an exhaust header and a conserving port communicating with said conserving chamber, each of said cylindrical valves having a passage formed therein arranged to register with said ports to successively provide communication between the adjacent cylinder port and the adjacent inlet port, between the adjacent inlet port and the adjacent conserving port, between the adjacent conserving port and the adjacent exhaust port, and between the adjacent exhaust port and the adjacent cylinder port.

6. In an internal combustion engine, a cylinder, two valve casings extending across said cylinder, two cylindrical valves, one rotatably mounted in each of said valve casings, and a bridge member between said cylindrical valves, said bridge member having a passage formed therein adapted to permit circulation of a cooling medium, each of said valve casings having a cylinder port communicating with said cylinder, an inlet port communicating with an intake header, and an exhaust port communicating with an exhaust header, each of said valves having a passage formed therein arranged to register with said ports to successively provide communication between the adjacent cylinder port and the respective adjacent inlet and exhaust ports.

7. In an internal combustion engine, a cylinder, two valve casings across said cylinder, two cylindrical valves, one rotatably mounted in each of said valve casings, and a bridge member located between said cylindrical valves, said bridge member forming the center of the outer end of the combustion chamber of said cylinder and substantially dividing said chamber into two connected parts, each of said valve casings having a cylinder port communicating with said cylinder, an inlet port communicating with an intake header, and an exhaust port communicating with an exhaust header, each of said valves having a passage formed therein arranged to successively provide communication between the adjacent cylinder port and the adjacent inlet port and between the adjacent cylinder port and the adjacent exhaust port.

8. In an internal combustion engine, a cylinder, a conserving chamber, a valve casing extending across said cylinder and a cylindrical valve rotatably mounted in said valve casing, said valve casing having a cylinder port communicating with said cylinder, an inlet port communicating with an intake header, an exhaust port communicating with an exhaust header, and a conserving port communicating with said conserving chamber, and said valve having a passage formed therein arranged to register with said ports to successively provide communication between said cylinder port and said inlet port, between said inlet port and said conserving port and between said exhaust port and said cylinder port.

9. In an internal combustion engine, a cylinder, a conserving chamber, two valve casings extending across said cylinder, two cylindrical valves, one rotatably mounted in each of said valve casings, and a bridge member located between said cylindrical valves, said bridge member forming the center of the outer end of the combustion chamber of said cylinder and substantially dividing said chamber into two connected parts, each of said valve casings having a cylinder port communicating with said cylinder, an inlet port communicating with an intake header, an exhaust port communicating with an exhaust header, and a conserving port communicating with a conserving chamber, each of said valves having a passage formed therein arranged to successively provide communication between the adjacent cylinder port and the adjacent inlet port, between the adjacent inlet port and the adjacent conserving port and between the adjacent exhaust port and the adjacent cylinder port.

10. In an internal combustion engine, a cylinder, a conserving chamber, two valve casings extending across said cylinder, two cylindrical valves, one rotatably mounted in each of said valve casings, and a bridge member located between said cylindrical valves, said bridge member forming the center of the outer end of the combustion chamber of said cylinder and substantially dividing said chamber into two connected parts, each of said valve casings having a cylinder port communicating with said cylinder, an inlet port communicating with an intake header, an exhaust port communicating with an exhaust header, and a conserving port communicating with a conserving chamber, each of said valves having a passage formed therein arranged to successively provide communication between the adjacent cylinder port and the adjacent inlet port, between the adjacent inlet port and the adjacent conserving port, between the adjacent conserving port and the adjacent exhaust port and between the adjacent exhaust port and the adjacent cylinder port.

WILLIAM R. STRICKLAND.